US011722439B2

(12) United States Patent
Bikkula et al.

(10) Patent No.: US 11,722,439 B2
(45) Date of Patent: Aug. 8, 2023

(54) BOT PLATFORM FOR MUTIMODAL CHANNEL AGNOSTIC RENDERING OF CHANNEL RESPONSE

(71) Applicant: Microsoft Technology Licensing, LLC, Redmond, WA (US)

(72) Inventors: Ravi K. Bikkula, Sammamish, WA (US); Amruta Shiroor, Kirkland, WA (US); Rakesh Chakari Mallareppa, Bellevue, WA (US); Chandrasekhar Subramanya Akkiraju Venkata, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 102 days.

(21) Appl. No.: 16/149,123

(22) Filed: Oct. 1, 2018

(65) Prior Publication Data

US 2020/0106722 A1    Apr. 2, 2020

(51) Int. Cl.
*H04L 51/02* (2022.01)
*H04L 51/52* (2022.01)
(Continued)

(52) U.S. Cl.
CPC .............. *H04L 51/02* (2013.01); *H04L 51/52* (2022.05); *H04L 67/75* (2022.05); *G06F 3/04817* (2013.01)

(58) Field of Classification Search
CPC ......... H04L 67/12; H04L 67/20; H04L 67/22; H04L 67/42; H04L 67/306; H04L 67/322;
(Continued)

(56) References Cited

U.S. PATENT DOCUMENTS 7,346,649 B1   3/2008 Wong
7,519,970 B2   4/2009 Jones et al.
(Continued)

FOREIGN PATENT DOCUMENTS

CN    101867762 A    10/2010
CN    102301401 A    12/2011
(Continued)

OTHER PUBLICATIONS

"Adaptive Cards", Retrieved from: http://web.archive.org/web/20180330113240/http://adaptivecards.io/, Retrieved Date: Mar. 30, 2018, 1 Page.
(Continued)

*Primary Examiner* — Farzana B Huq
(74) *Attorney, Agent, or Firm* — Shook, Hardy & Bacon L.L.P.

(57) ABSTRACT

A system for rendering a channel response includes a template library and a bot server program. The template library includes a plurality of card templates for rendering entities as cards in different channels to perform bot skills of bots. Each of the card templates includes one or more entity properties to which entity data is bound, and the card templates include different templates for different entities and different channels, allowing an entity and its corresponding entity properties to be rendered in multiple channels for a bot implementing a bot skill. The bot server program receives an input invoking the bot skill of the bot; determines an entity to be rendered as a card to perform the bot skill; selects a card template based on the channel and the entity; binds the entity data to the entity properties of the selected card template and generates and sends a channel response.

19 Claims, 8 Drawing Sheets

(51) Int. Cl.
*H04L 67/75* (2022.01)
*G06F 3/04817* (2022.01)

(58) Field of Classification Search
CPC ....... H04L 67/327; H04L 51/16; H04L 51/18; H04L 51/32; H04L 51/36; H04L 51/38; H04L 51/046; H04L 12/185
USPC .......................................................... 709/206
See application file for complete search history.

(56) References Cited

U.S. PATENT DOCUMENTS

| | | | |
|---|---|---|---|
| 2003/0085918 A1 | 5/2003 | Beaumont et al. | |
| 2004/0223009 A1 | 11/2004 | Szladovics et al. | |
| 2007/0222788 A1 | 9/2007 | Abrams et al. | |
| 2007/0300185 A1 | 12/2007 | Macbeth et al. | |
| 2010/0064208 A1 | 3/2010 | Valtchev | |
| 2012/0216136 A1 | 8/2012 | Karstens | |
| 2016/0094490 A1 | 3/2016 | Li et al. | |
| 2017/0168684 A1 | 6/2017 | Meisels et al. | |
| 2017/0180284 A1* | 6/2017 | Smullen | H04L 69/14 |
| 2017/0286269 A1 | 10/2017 | Furman et al. | |
| 2017/0373992 A1* | 12/2017 | Nair | H04L 67/06 |
| 2018/0107461 A1 | 4/2018 | Balasubramanian et al. | |
| 2018/0130471 A1 | 5/2018 | Trufinescu et al. | |
| 2018/0302347 A1* | 10/2018 | Landowski | H04L 51/214 |
| 2018/0322403 A1* | 11/2018 | Ron | G06N 5/04 |
| 2018/0375947 A1* | 12/2018 | Hodges | H04L 67/10 |
| 2019/0124020 A1* | 4/2019 | Bobbarjung | G06Q 20/123 |
| 2019/0306107 A1* | 10/2019 | Galbraith | H04L 51/56 |
| 2019/0311036 A1* | 10/2019 | Shanmugam | H04L 51/02 |
| 2019/0384794 A1* | 12/2019 | Holly, Jr. | G06F 40/10 |
| 2021/0049217 A1* | 2/2021 | Ogawa | G06N 5/04 |

FOREIGN PATENT DOCUMENTS

| | | |
|---|---|---|
| CN | 102495769 A | 6/2012 |
| CN | 102622219 A | 8/2012 |
| CN | 107301048 A | 10/2017 |

OTHER PUBLICATIONS

Raheel, Saeed, "Improving the User Experience using an Intelligent Adaptive User Interface in Mobile Applications", In Proceedings of IEEE International Multidisciplinary Conference on Engineering Technology, Nov. 2, 2016, 5 Pages.

"International Search Report and Written Opinion Issued in PCT Application No. PCT/US2019/054053", dated Dec. 17, 2019, 10 Pages.

"First Office Action and Search Report Issued in Chinese Patent Application No. 201980065177.0", dated Jan. 25, 2022, 19 Pages.

"Second Office Action Issued in Chinese Patent Application No. 201980065177.0", dated Aug. 29, 2022, 24 Pages.

"Office Action Issued in Chinese Patent Application No. 201980065177.0", dated Feb. 11, 2023, 20 Pages.

* cited by examiner

BOT PLATFORM FOR MUTIMODAL CHANNEL AGNOSTIC RENDERING OF CHANNEL RESPONSE

BACKGROUND

Bots today are software programs that perform an automated task. An exemplary bot is a chatbot, which is a type of bot in which a chat client program exchanges messages with a server-side bot program. Bot programs may be built, for example, using the Microsoft® Bot Framework. Bot developers can design their bot programs so that a response sent by the server-side bot program to the chat client program includes a visual card or a speech card.

Bot programs may be designed to communicate over a variety of different communication channels. These communication channels are services that facilitate communication between a user and another user or a user and a bot. Exemplary communication channels that allow a user to communicate with a bot include, but are not limited to, SMS, email, Skype®, Skype for Business®, Slack®, Facebook Messenger®, Cortana®, Outlook® or the like. Each of these channels may output data in one or more canvases, such as a speaker (e.g., a Cortana® supported speaker), mobile phone, desktop, etc. In order for a server-side bot program to communicate with a user using a visual or speech card, the individual channels must provide support for presenting data to users as cards. Today, channels that support cards require a developer to adhere to a specific format dictated by the channel. For example, Cortana® supports Hero cards, which allow a bot program to communicate with a user using a card having a particular format containing image, title, subtitle and description components.

Each of these channels may support one or both of visual cards and speech cards. With respect to visual cards, the look and feel of each of the components of the card is fixed by the channel, which is problematic in that customization is limited. For example, a developer is often limited in what font or size they can use for text, and in what type of image they can present to a user. In addition, each channel may have its own format of representing a card in a bot response that is different from another channel's format, and channels that support speech may each have their own native speech markup language governing how speech is read to a user. These variations require code to be written for each channel's response format in order to render a card with the same entity and entity properties in different channels.

It is with respect to these and other general considerations that embodiments have been described. Also, although relatively specific problems have been discussed, it should be understood that the embodiments should not be limited to solving the specific problems identified in the background.

BRIEF SUMMARY OF THE INVENTION

The following presents a simplified summary in order to provide a basic understanding of some aspects described herein. This summary is not an extensive overview of the claimed subject matter. It is intended to neither identify key or critical elements of the claimed subject matter nor delineate the scope thereof. Its sole purpose is to present some concepts in a simplified form as a prelude to the more detailed description that is presented later.

According to one aspect of the present disclosure, a system for rendering a channel response is provided, comprising a processor and a memory. A template library is stored in the memory, and a bot platform program operates on the processor. The template library comprises a plurality of card templates for rendering entities as cards in different channels to perform bot skills of bots. Each card template comprises one or more entity properties to which entity data is bound. The plurality of card templates comprise different card templates for different entities and for the different channels allowing an entity and its corresponding entity properties to be rendered in a plurality of the different channels for a bot performing a bot skill. The bot server program is configured to receive, from a computing device communicating over a channel from among the plurality of different channels, an input invoking the bot skill of the bot; select, from the template library, a card template from the plurality of card templates, the card template being selected based at least on the entity to be rendered to perform the bot skill of the bot and the channel in which the entity is to be rendered; bind the entity data to the one or more entity properties of the selected card template and generate a channel response; and send the channel response to the channel.

According to another aspect of the present disclosure, a method for rendering a channel response by a platform comprises: receiving an input from a computing device communicating over a channel; determining, from the input, an entity to be rendered in order to perform a bot skill of a bot invoked by the input; the entity having a plurality of card templates associated therewith for rendering the entity in a card in different channels, and the entity having one or more entity properties represented in each of the plurality of card templates

BRIEF DESCRIPTION OF THE FIGURES (NON-LIMITING EMBODIMENTS OF THE DISCLOSURE)

Various embodiments in accordance with the present disclosure will be described with reference to the drawings, in which.

DETAILED DESCRIPTION

In the following detailed description, reference is made to the accompanying drawings which form a part hereof, and in which are shown by way of illustration specific embodiments. These embodiments are described in sufficient detail to enable those skilled in the art to practice the technology, and it is to be understood that other embodiments may be utilized and that structural, logical and electrical changes may be made without departing from the spirit and scope of the disclosure. The following detailed description is therefore not to be taken in a limiting sense, and the scope is defined only by the appended claims and equivalents thereof. Like numbers in the figures refer to like components, which should be apparent from the context of use.

Aspects of the disclosure provide a bot platform that enables bot developers to generate dynamic content in the form of visual cards, speech cards and Web UI cards and present this content across a variety of different channels and canvases. These visual cards and speech cards provide a user interface to a user that may, for example be a rich graphical user interface and/or speech.

Aspects of the disclosure provide a bot platform that facilitates greater customization capabilities and allows a developer to provide cards with rich graphical content. The bot platform allows developers to create visual cards with this rich graphical content using familiar presentation technologies such as HTML and CSS. The card creation provides customization capabilities allowing developers to provide rich graphical user interfaces and the ability to append this rich content over a variety of channels.

Aspects of the disclosure provide a platform in which a template library can be accessed to create channel responses across a variety of different channels supporting different card formats. The template library allows a bot to implement its bot skill to display or read its entities to users using the same card configuration across multiple channels without having to write code for each of the different channels.

Figure 1:
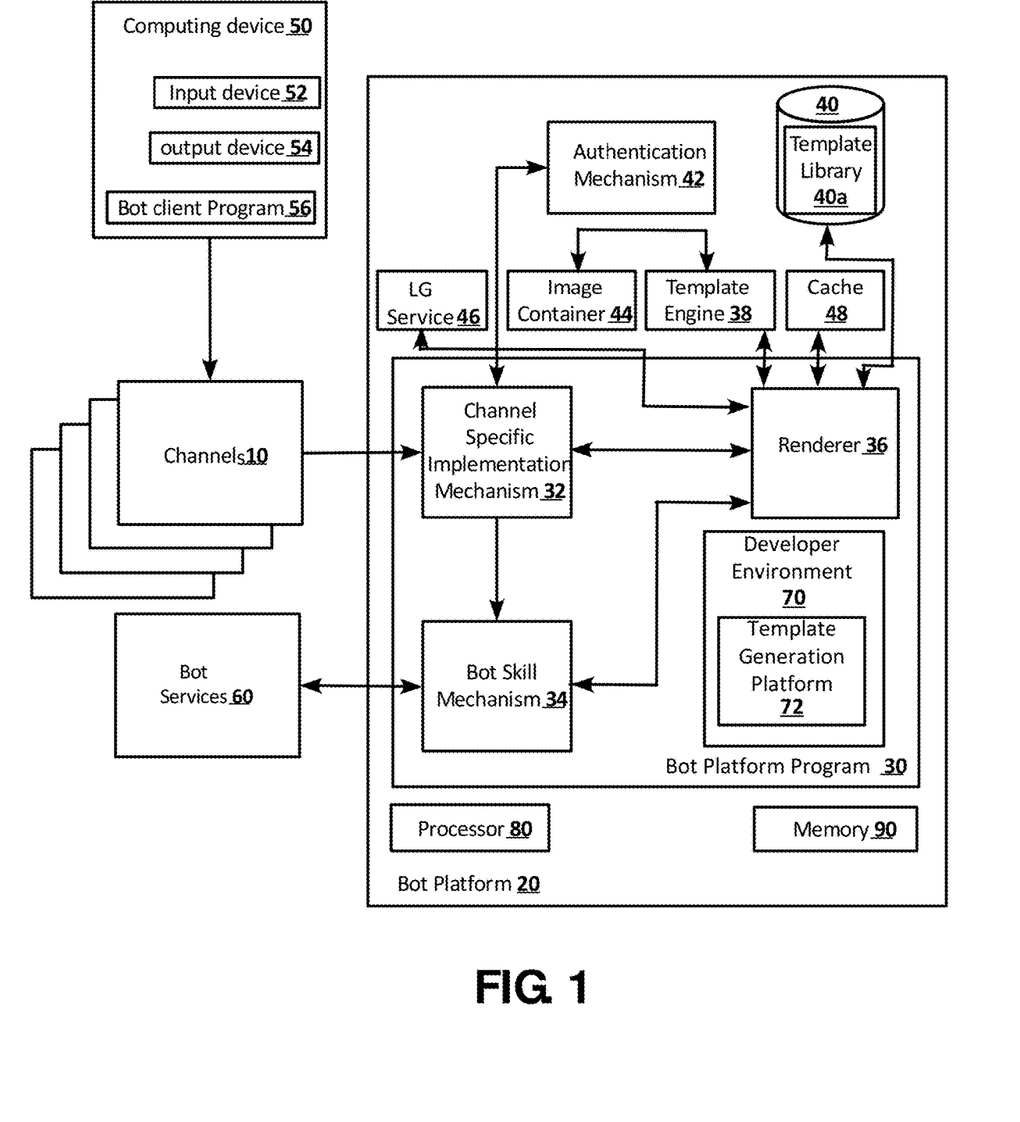
FIG. 1 shows a schematic representation of a bot platform for rendering entities in various channels according to an embodiment of the present disclosure.

FIG. 1 schematically shows a bot platform 20 for rendering entities in various channels to perform the bot skill of bots being implemented on the bot platform 20. FIG. 1 also schematically shows a computing device 50 that communicates with the bot platform 20. The computing device 50 includes an input device 52 and an output device 54. Input device 52 allows a user to input data through text or speech and may include one or more of a microphone, keyboard, camera and touchscreen. Output device 54 may include one or more of a display and a speaker. The computing device 50 includes a processor and memory and may be a laptop computer, smartphone, tablet, desktop computer or a headless device. The processor of the computing device 50 executes a bot client program 56.

A computing device 50 may communicate with the bot platform 20 over a variety of different communication channels 10. Each of these communication channels may be implemented by a server, and each provides a service that facilitates communication between the computing device 50 and the bot platform 20. Examples of channels include, but are not limited to SMS, email, Skype®, Skype for Business®, Slack®, Facebook Messenger®, Cortana®, Outlook®, Telegram® or the like. An individual communication channel 10 may also be available in different canvases depending on the type of computing device 50 that is being used. For example, an individual channel may support a canvas for a headless computing device such as a speaker that uses a microphone as an input device 52, a canvas for a smart phone, and a canvas for a personal computer. The different canvases for the different computing devices 50 can be different types of visual layouts or speech.

Bot platform 20 provides a platform for a plurality of bots to implement their respective bot skills. The bot skill of a particular bot defines the functionality of the bot and includes the steps that a bot performs when communicating with a user. In the case of presenting a card to a user, the bot skill includes rendering one or more entities having certain entity properties within the card. Bot platform 20 includes a bot platform program 30 that is executed on processor 80. The bot platform program 30 includes a channel specific implementation mechanism 32, a bot skill mechanism 34, and a renderer 36. Bot program 30 may retrieve information for services such as bot services 60, language generation service 46 and template engine 38, and may perform authentication with authentication mechanism 42. Bot program 30 pulls card templates for generating channel responses for different channels from a template library 40a which may be housed in a database 40 stored in the memory 90.

The template library 40a comprises a plurality of card templates for rendering entities as cards in different channels for bots performing their bot skills. The individual templates describe how a card is visually structured in the case of a visual card being shown over a channel 10, how a card is to be spoken in the case of a speech card being read on a headless device or other device supporting speech, or even how the card should be visually structured and spoken in the case that the channel 10 supports both visual and speech cards. To display cards, each of the different channels may have a different format with fixed components. As discussed above, in conventional systems the fixed nature of these components limits customization, and because their format differs depending on channel, a developer cannot present his or her entities in a single card across different channels without additional coding. By virtue of the template library of the present disclosure, the bot developer does not have to write this additional code and is enabled to present the entities he or she wishes to have rendered as cards over multiple channels. The template library 40a also increases the ability to customize these cards.

The templates contained in the template library may include standard card templates in which the components of the card are structured as defined by the particular channel in which they are presented, speech markup language templates or they may be image cards containing HTML and/or CSS that give the bot developer the ability to create rich content and present this content in their card. A bot developer may specify the entity properties they wish to be shown in a card when his or her bot performs its bot skill, and templates may be created and housed within the template library 40a so that their entity data can be presented across multiple channels. Thus, template library 40a contains information on how a developer prefers their entity to be displayed for a particular channel, canvas, and entity when the bot performs its bot skill. Furthermore, the same template can be used by different bots who wish to display the same entity in the same manner.

Figure 2:
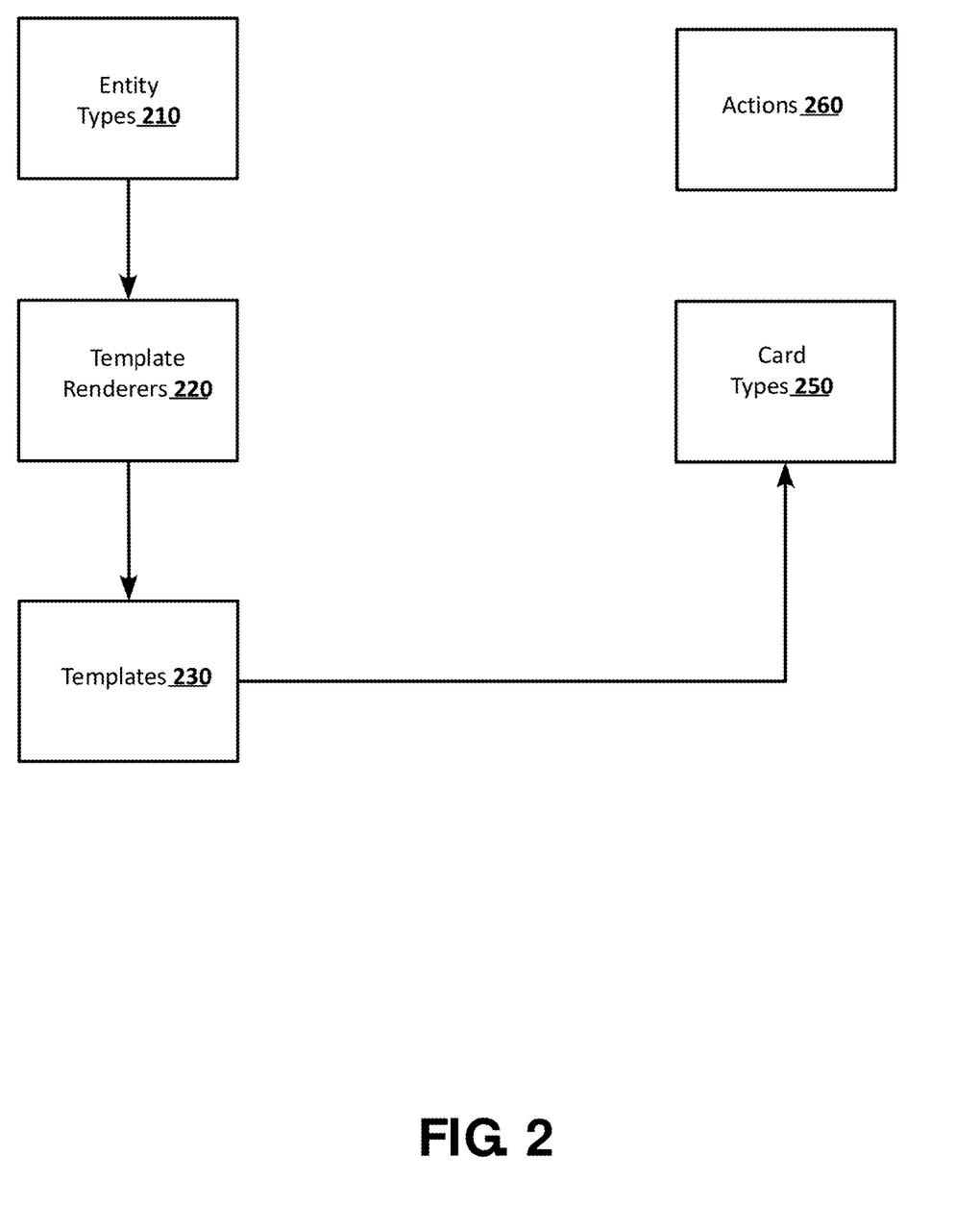
FIG. 2 shows an exemplary data model for data stored in the database.

FIG. 2 shows an exemplary data structure for the database 40 containing the template library 40a. The data structure shows an exemplary organizational structure for the data housed in the database 40. Referring to FIG. 2, the templates defined in the template library 40a are first organized by their entity type, and the various entity types are included in the entity types collection 210. The entity types are dictated by the ontology of the platform 20, and the various bots that are implemented by the platform 20 may use one or more of these entity types when implementing its bot skill. For example, a weather bot's skill may include providing the current weather to a user by rendering a weather entity in a card, in which case the entity type is 'weather'. With respect to an incoming communication from one of the communication channels 10, an entity is an instance of a given entity type, and entities are determined from the context of the incoming communication received from the channel 10, which may depend on various factors such as the content of the user input and the number of turns the user has completed with the bot. The entity type may be determined by the platform 20 based on the bot skill of the bot being invoked by the incoming communication. Some exemplar entity types include weather, stock, recipes, and the like.

Entities each have entity properties, which are attributes of the entity. These entity properties have entity data associated therewith, and the entity data may be dynamic data that changes over time. For example, a stock entity and a weather entity each have entity properties whose data changes over time, such as a stock price or the temperature and precipitation at a current or future time. By retrieving the dynamic data and binding it to the entity properties associated with the entity, the bot platform is able to render a card with the most up-to-date data possible.

Returning to FIG. 2, the template library 40a may then be organized by template renderer, and each entity type 210 can have one to many template renderers. The template renderers are included as part of a template renderers' collection 220. A template renderer takes a template selected from the template library and renders the entity in the template by binding entity data to the entity properties of the selected template. An individual template render handles a class of templates and is adapted to render the templates within its class. Different template renderers may exist for different channels, different canvases, and different card types to allow entities to be displayed over different channels and canvases in different manners while adhering to the different standards expected by these channels. For example, it may be desirable to present an entity in different ways depending on the number of entities that are presented in a card. If more than one entity is presented in a card, a template renderer can be selected to present the entity data in a shortened form to deal with the size constraints of the channel or the computing device's output device 54. The template renderers collection 220 holds all of the templates for the individual template renderer, and each template renderer may, e.g., have one template per channel, canvas, card type and single/multiple entities being rendered.

Each template renderer may have one to many templates. The templates collection 230 includes all of these templates. Templates define how entities are to be formatted in the card when a bot implements its bot skill. Templates may define the entity properties a bot developer wishes to display (i.e., what entity properties the developer wishes to show or speak out in a card) and the arrangement of these properties within the card. The templates in the template library 40 adhere to standards of the particular channel for which they are created, but also provide additional flexibility through the inclusion of image templates for providing rich graphical content. The templates collection 230 also allows a bot developer to use the same set of entity properties to create templates for generating channel responses across a variety of channels. The templates collection 230 includes different templates for different entities, different channels, different canvases, different card types and single/multiple entities being rendered. Referring to FIG. 1, templates may be created by a bot developer in a developer environment 70 that uses a template generation program 72 for tying the entities and entity properties that the developer wants to display to templates appropriate for creating channel responses in the channels where the developer wants to render entities.

Figure 3A:
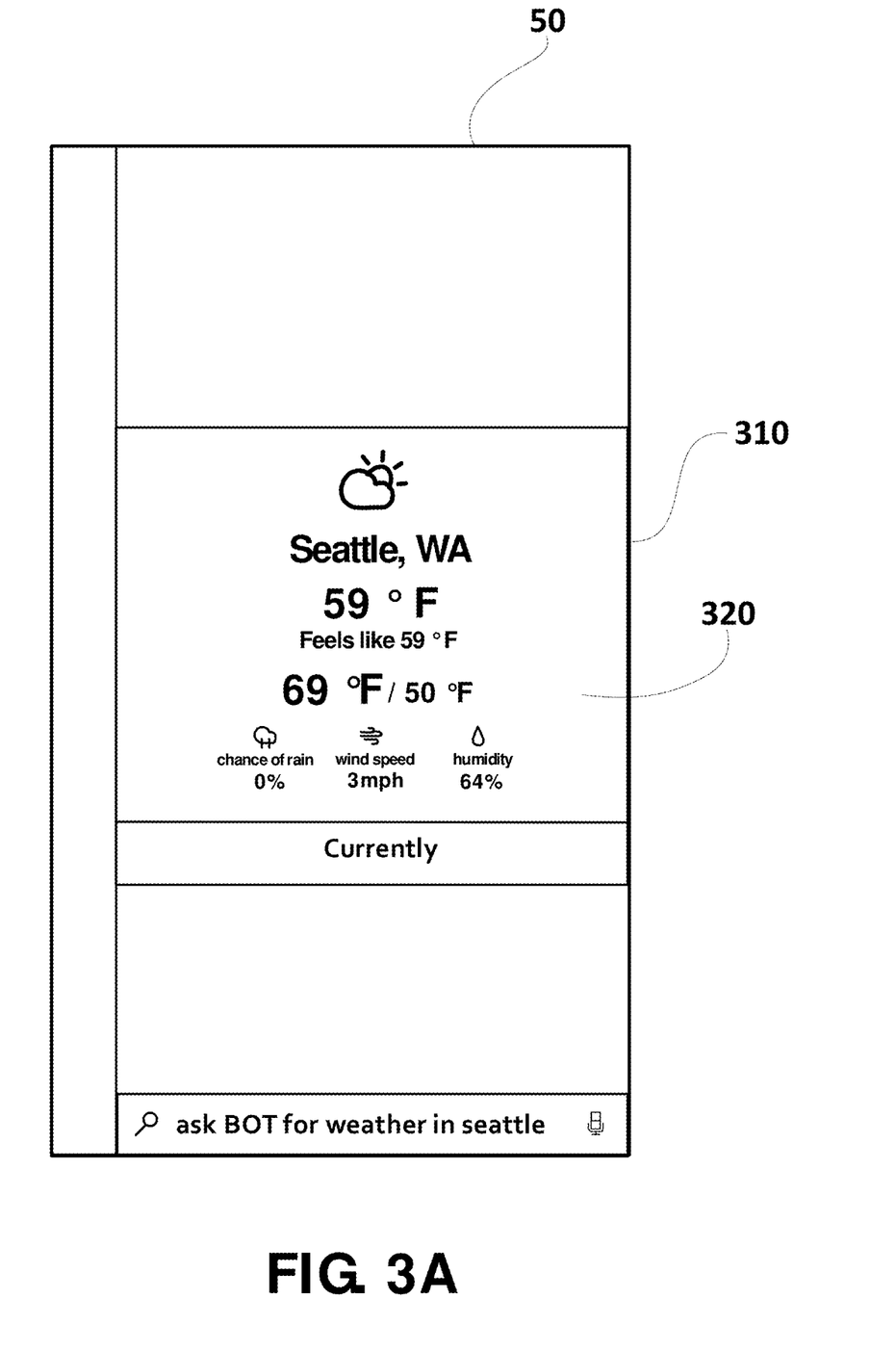
FIGS. 3A-3C show exemplary cards each of which represents an entity or entities rendered in a particular channel on a computing device.

The templates included in the template library 40a may include standard templates (i.e., templates in the format dictated by the channel), image templates, and language generation templates. An exemplary card generated based on a standard template is shown in FIG. 3A, which illustrates a weather entity 320 represented in card 310 displayed on the output device 54 of a computing device 50. The standard template includes the entity properties of the entity that the developer chooses to show in the card when performing the bot's bot skill in the particular channel 10 through which the bot is communicating. When a bot developer creates a template using the template generation program 72, the developer may dictate the particular entity properties he or she wishes to display to the template generation program 72, and the template generation program then generates a template for the bot. Templates can be reused any number of times and may also be utilized and reused by different bots.

When a bot skill is being implemented to render an entity with a template renderer using a standard template, entity data is bound to the entity properties of the template. This entity data may be dynamic data for generating dynamic content. For example, in the case of a weather bot, the current temperature is a type of dynamic data that may be bound to a standard template to create a card with dynamic content. The standard template itself may, for example, include attributes such as entity type and entity properties, the channel in which the entities are being rendered, the canvas on which the entities are being rendered, whether a single or multiple entities are being rendered, and the card type (i.e., the configuration of the components in the card).

An image template is a template that includes HTML and/or CSS for generating an image that can be inserted into a card format accepted by the channel for which the image template is created. For example, a standard card for a particular channel may include a title component, a subtitle component and an image component. HTML and/or CSS may be included in the template to generate an image that can be inserted into the image component. The HTML and/or CSS can be used to create a rich graphical image having, for example, a picture overlaid with text having a particular font and size designated by the developer. The HTML and/or CSS can also be used to create a rich web user interface (UI) that a user can interact with by, for example, clicking on buttons that perform certain actions. If a developer chooses, the developer can include this HTML and/or CSS in a template when the template is created using the template generation program 72.

Figure 3B:
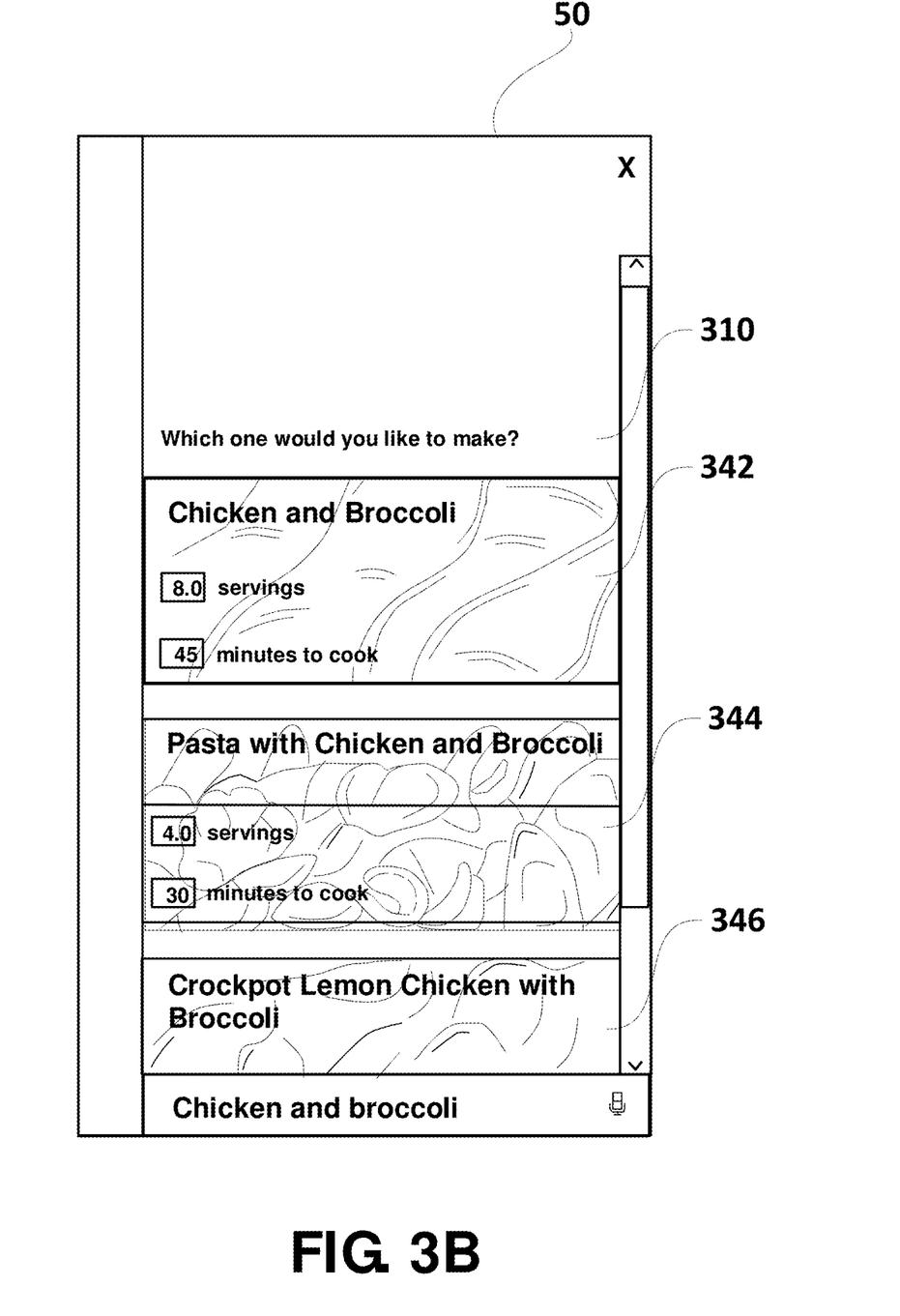
Figure 3C:
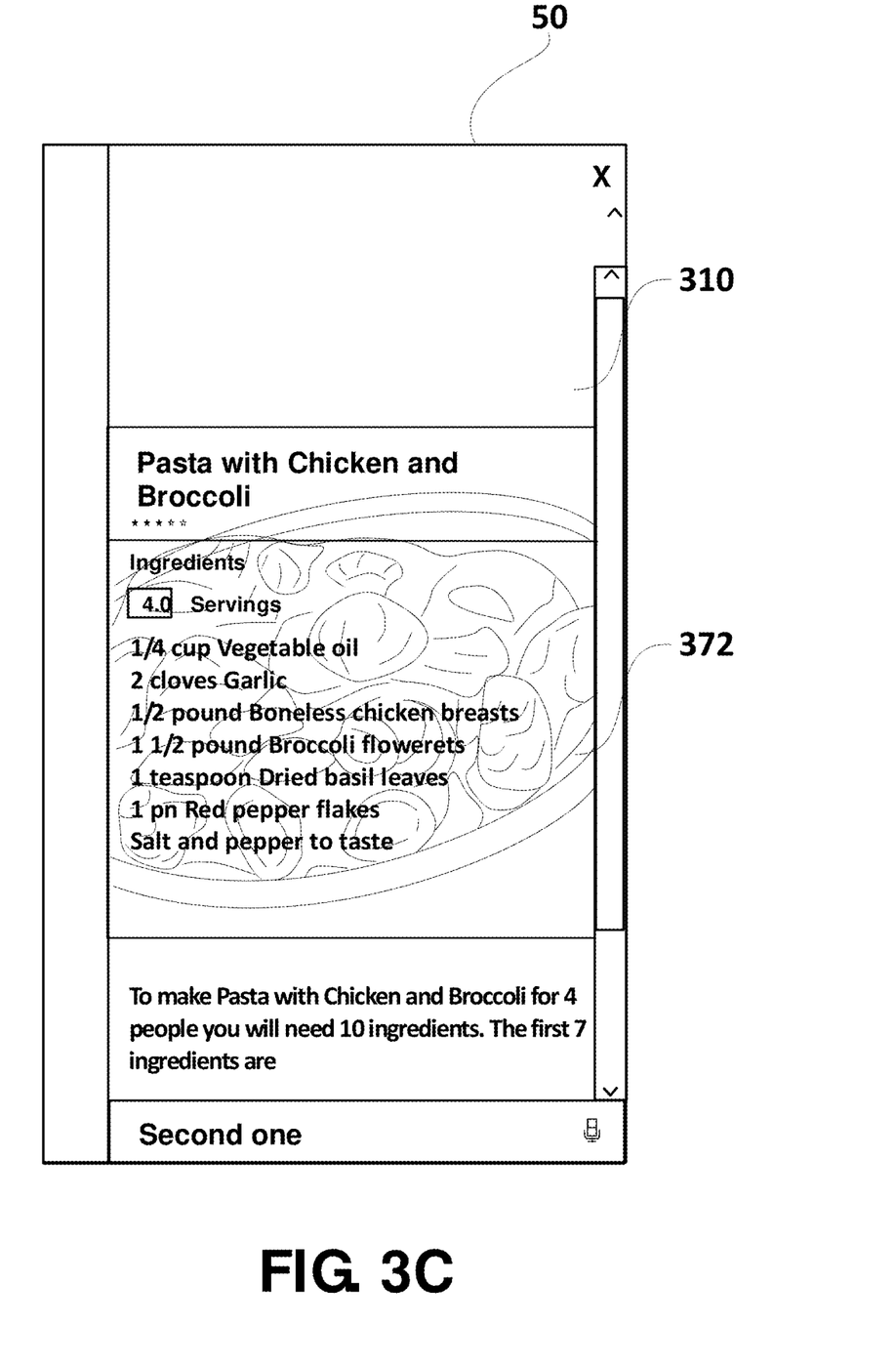

When a bot skill is being implemented to render an entity using an image template, entity data is bound to entity properties that are contained within the HTML and/or CSS. This entity data may be dynamic data, in which case a dynamic image is created from the HTML and/or CSS. The image template may include attributes such as the channel in which the entities are being rendered, the canvas type, the entity type and entity properties being rendered, whether a single or multiple entities are being rendered, the card type, the dimensions of the image being created with the HTML and/or CSS, and the HTML and CSS associated with the image. FIGS. 3B and 3C illustrate exemplary cards in which rich content is displayed using templates containing HTML and/or CSS.

The language generation templates are templates for creating channel responses in a channel that supports speech. The language generation templates contain a speech markup language, such as Speech Synthesis Markup Language (SSML) that is used to render language in a channel response. As explained above, each of the different channels may have its own native speech markup language. The language generation templates include speech markup language for replying appropriately in the particular channel and canvas. When rendering a language generation template with a template renderer, entity data is bound to entity properties that are contained within the speech markup language. This entity data may be dynamic data so that dynamic speech is created from the speech markup language. The language generation template may include attributes such as the channel in which the entities are being rendered, the canvas type, the entity type and entity properties being rendered, whether a single or multiple entities are being rendered, the card type, and the speech markup language associated with the speech.

Returning to FIG. 2, card types collection 250 describes the different card types available. The template library 40 may include different templates for different card types. A card type is the configuration of the components in the card. A card type may, e.g., be an audio card (e.g., streaming music), a multiple entity card, a single entity card, etc. Each of the channels may allow for multiple formats in which the components of a card can be displayed in a given canvas. For example, there may be different card type that provide for more or less detail or different types of details. The card types collection 250 includes different card types for the different formats.

Actions 260 are ways in which a user interacts with the card. Actions are specified in the bot skill of the particular bot being implemented by the bot platform, and these actions can be bound to certain entity types according to the bot skill. Actions may, for example, take the form of a button that a user can press using input device 52. Upon selection of the action, the user will get the bot platform's 20 runtime access to the entity associated with the action selected. Actions may also launch external URLs, which do not require access to the bot platform 20 when selected by a user. If a card includes multiple entities, actions are rendered for each of the entities. The bot skill mechanism 34 determines whether to bind these actions.

Entities may be organized into a class level inheritance hierarchy, in which a base entity can have multiple sub-entities. This class level inheritance hierarchy makes it possible to establish templates for a base entity which will be applied to its sub-entities. This is advantageous in that it reduces the total number of templates that have to be created, because templates do not have to be defined for every entity. Instead, the base class defines how the entity should look in the particular channel and canvas, and the subclasses may then use the base template renderer and templates. An exemplary usage of the class level inheritance hierarchy is where the base class entity is person type and the sub-class entities are Employee, Manager, and Contractor. In this case, there are four types in the ontology. Specific templates (and their associated template renderers) do not have to be defined for three of these types, namely, the Employee, Manager, and Contractor types. Given the type hierarchy, the platform will determine the base class entity if there is not a template defined for these sub-class entities, and will choose the template renderers and pull the templates for the Person type. Although a simply base-class sub-class relationship has been described for the class level inheritance, it should be understood that the class level inherency hierarchy can extend further, with a sub-class being the base-class for another sub-class. In this case, when a template is absent for a sub-class entity, the bot platform program 30 may walk up multiple levels of the hierarchy until a base-class template is found.

Returning now to FIG. 1, the channel specific implementation mechanism 32 receives, as an input, a user query from the channel 10. The channel specific implementation mechanism 32 inspects the packets contained in the user query, and from the context of the received query, the channel specific implementation mechanism 32 determines who the user is that is sending a query, what bot and bot skill the user is attempting to invoke, the channel over which the query was sent, the canvas on which the entities are being displayed, and whether there are single or multiple entities being rendered as a card. The channel specific implementation mechanism then passes this information to the bot skill mechanism 34 and the renderer 36.

The bot skill mechanism 34 implements the particular bot skill for the bot that is being invoked. The bot skill defines the functionality of the bot and includes the steps that a bot performs when communicating with a user. In the case of presenting a card to a user, the bot skill includes the bot's ability to generate a card that includes the entity properties of the particular entity that the bot skill determines should be rendered as a response to a user input. For example, if the channel specific implementation mechanism 32 determines from the context of the user query that a weather bot is being invoked, the bot skill mechanism performs the skill for the weather bot. The bot skill mechanism 34 may also determine which entity render based, for example, on the context of the user's input, the number of "turns" in which the bot has communicated with the user, prior interactions with the user, etc. The bot skill mechanism 34 may communicate in the semantic conversation language (SCL) in which the bot was written. In this case, the bot platform 20 interprets this language and executes it.

The bot skill mechanism 34 pulls the entity data for the particular entity determined from the context of the user query, and passes this entity data do the renderer 36. The entity data may be pulled from bot service 60, which may be an external service that the bot skill mechanism 34 calls to retrieve entity data. The entity data retrieved from the bot service may be dynamic data for generating entities with dynamic content. For example, in the case of the weather bot, dynamic data may include temperature, precipitation, Hi/Lo temperature, etc. The bot skill mechanism 34 also determines if an action should be bound to the entity that is being rendered. This determination is made based on the custom logic the skill developer has provided for their bot.

Renderer 36 receives the channel and the canvas information from the channel specific implementation mechanism 32 or the bot skill mechanism 34 and receives the entity type information from the bot skill mechanism 34. Renderer 36 then determines the appropriate template renderer and template based on the entity, channel, canvas and single/multiple entities being rendered. Take, for example, the case in which the weather bot is being invoked. The channel specific implementation mechanism 32 determines that weather entity should be rendered and determines the specific channel, specific canvas and that a single entity is being rendered. The renderer 36 takes this information and pulls the templates having the weather entity type and finds the template for the specific channel, specific canvas, and single entity using the attributes of the templates. In this case, the particular template(s) pulled from the template database will be the template specified by the developer and will have the desired card type. If multiple templates are available that can be used for the specific channel, specific canvas, and single entity, the particular template specified by the developer is used by determining if the developer has specified a particular renderer ID for this case. If the developer has not specified a particular template, the system will chose the appropriate template or will choose a default template.

Once the renderer 36 pulls the appropriate template, the renderer 36 uses the associated template renderer to bind the entity data obtained by the bot skill mechanism 34 to render a template response. In doing so, the renderer calls to the template engine 38 to create an image or calls to the language generation service 46 if necessary. The template response is then transmitted to the channel specific implementation mechanism 32 to generate a channel response. The channel specific implementation mechanism 32 then adapts the template response to the appropriate channel 10 by generating channel appropriate packets that can be interpreted by the channel 10. The channel specific implementation mechanism 32 then sends the channel response to the channel 10.

Template engine 38 is a service that the renderer 36 calls to in order to generate an image based on the HTML and/or CSS included in an image template. When the renderer 36 selects an image template having HTML and/or CSS, the HTML, renderer 36 first binds the entity data to the entity properties included in the HTML and/or CSS. The renderer 36 then sends the bound HTML and/or CSS to the template engine 38. The template engine 38 generates an image that can be inserted into the appropriate card component. The image may be captured using, for example, a screenshot technology for capturing an image of HTML and/or CSS in a headless environment, examples of which include Headless Chrome® and PhantomJS®.

The image generation performed by the template engine 38 may take more time than is expected to receive a channel response. In order to account for this additional time, template engine 38 may submit a background job for the image conversion, while also creating a Uniform Resource Locator (URL) that references the location that the image will be stored in an image container 44. The URL is then sent with the template response transmitted to the channel specific implementation mechanism 32. The channel specific implementation mechanism 32 then adapts the template response to the appropriate channel 10 by generating channel appropriate packets that can be interpreted by the channel 10. The channel specific implementation mechanism 32 then sends the channel response to the channel 10. Once the image is created, the image is stored in an image container 44, which may, for example, be stored in the memory 90 of the bot platform 20. The image will have been created and stored in the image container 44 by the time the channel 10 is ready to render the image, and at this time, the channel may access the location where the image is stored in the image container 44 using the URL pointing to the image.

Language generation service 46 is a service that the renderer 36 calls to in order to generate speech based on the speech markup language included in a template. When the renderer 36 selects a template having speech markup language, the renderer binds entity data to the entity properties of the speech markup language and then sends the bound speech markup language to the language generation service 46. The language generation service takes the bound speech markup language and generates the appropriate natural language and returns this to the renderer 36 in the form of speech markup language. The renderer then generates a template response based on the speech markup language it receives from the language generation service 46.

The template response is then transmitted to the channel specific implementation mechanism 32 to generate a channel response. The channel specific implementation mechanism 32 then adapts the template response to the appropriate channel 10 by generating channel appropriate packets that can be interpreted by the channel 10. The channel specific implementation mechanism 32 then sends the channel response to the channel 10.

Authentication mechanism 42 is used to return information about an authenticated user that may be used by the bot skill mechanism 34 to determine the user's preferences. These user preferences can be in turn be used by the bot skill mechanism 34 to determine which entities to display. A particular user can be determined from the context of the user query. The channel specific implementation mechanism determines the user from the context, and calls to the authentication mechanism 42 to authenticate the user and to pass information to the bot platform 20. In this way, the bot skill mechanism 34 can cater to the user's particular preferences. For example, if a user prefers a certain car service over another, this information can be used by the bot skill mechanism to render an entity for the particular car service.

The bot platform 20 may also include a cache 48 for caching template responses. After binding entity data to one or more entity properties of the card template to create a template response, this template response may be stored in the cache 48 for later use should there be a request for the same entity. The cache 48 may utilize unique signature hashes for the template responses stored in the cache 48. Prior to calling to the template library in database 40, the renderer may refer to the cache 48 to see if the hash of the current entity being rendered matches a template response in the cache 48. If there is a match, the template response in the cache can be reused. The hashes for template responses stored in the cache 48 include a timestamp so that it can be determined if the hash has expired. This ensures that up-to-date information is returned as a channel response, which is especially important in the case of dynamic data.

FIGS. 3A-3C show exemplary cards each of which represents an entity or entities rendered in a particular channel 10 and canvas on a computing device 50. The computing device 50 shown in FIGS. 3A-3C is a smartphone, but computing device 50 may be any computing device 50 capable of displaying or reading cards. FIG. 3A shows a card 310 in which a single entity 320 has been rendered in a standard card format supported by the channel 10. In FIG. 3A, a weather bot is interacting with a user, and a user query "ask bot for weather in Seattle" has been sent to the bot platform 20. Based on the context of the user query, the bot platform 20 has determined the channel and canvas (smartphone) and that a weather skill is being invoked. The bot platform 20 has pulled the appropriate template from the template library 40 and has generated a channel response based on the pulled template. The channel 10 has rendered the bot response to the user, which is displayed in FIG. 3A. The exemplary entity 320 shown in FIG. 3A is a weather entity 320 whose entity properties include location, temperature, Hi/Low temperature, precipitation, wind speed and humidity. Of course, a weather entity is not limited to these particular entity properties. FIG. 3B shows multiple entities 342, 344, 346 rendered in a card for a recipe bot, and FIG. 3C shows a single entity 372 rendered in a card 310 for the same recipe bot. FIGS. 3B and 3C illustrate the difference in format for the entities based on the number of entities being rendered.

Figure 4:
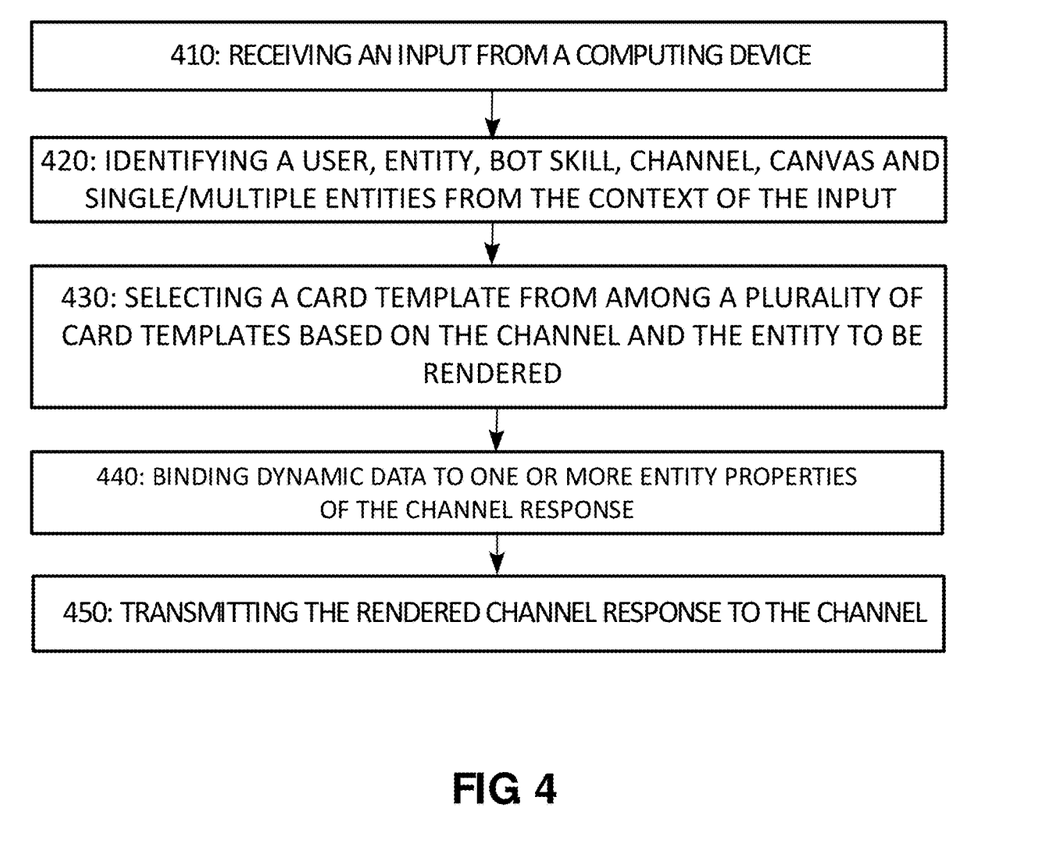
FIG. 4 shows an exemplary method for executing a bot platform program according to an embodiment of the present disclosure.

FIG. 4 shows an exemplary method for executing a bot platform program 30 of a bot platform 20. In this method, a bot is implementing its bot skill to render an entity, and a template is pulled from the template library to generate the appropriate channel response for the channel through which the bot client program 56 is communicating with the bot platform 20. Referring to FIG. 4, at step 410, the bot platform 20 receives an input from the channel 10. The input may be a user query from a computing device 50, and the input invokes a bot having a bot skill that can be implemented by the bot skill mechanism 34 of the platform 20 to render one or more entities for a card that will ultimately be displayed or read by the output device 54 of the computing device 50.

In step 420, the bot platform 20 identifies an entity to be rendered in performing a bot skill of a bot from the context of the input. In addition to identifying the entity to be rendered, the bot platform 20 may also identify, based on the context of the input, the identity of the user sending the query, the bot skill the user is attempting to invoke, the channel over which the query was sent, the canvas on which the entities are being displayed or read, and whether there are single or multiple entities being rendered as a card.

In step 430, the bot platform 20 selects a card template from among a plurality of card templates in the template library based on the channel and the entity to be rendered to perform the bot skill. In addition to the channel and entity, the template may be selected based upon the canvas, the number of entities being rendered and the card type. Thus, template library is accessed to pull a template to rendering an entity according to the a bot developer's preference for displaying his or her entity for a particular channel and canvas. As discussed above, the templates contained in the template library may include standard card templates in which the components of the card are structured as defined by the particular channel in which they are presented, language generation cards, or they may be image cards that give the developer the ability to create rich content and present this content in their card. The entity properties to be shown in a card are specified in the templates, and these templates allow a bot developer to display their templates across multiple channels. The card template selected to render the entity may be a template that was created by the bot developer and stored in the template library 40*a* or a template already existing in the template library 40*a* that is reused by the bot developer to perform the bot skill of his or her bot.

In step 440, the bot platform 20 binds entity data to one or more entity properties of the selected template to render a template response. The entity data may be dynamic data retrieved from a bot service 60, which allows a channel response containing dynamic content to be sent to the channel. Entity data may be bound to the selected template using a server-side rendering technology such as AngularJS® server side rendering.

In step 450, the bot platform 20 generates a channel response and sends the channel response to the user. The channel response may be generated by taking the template response and adapting it to the appropriate channel 10 by generating channel appropriate packets that can be interpreted by the channel 10. The method illustrated in FIG. 4 makes it possible to create channel responses across a variety of different channels supporting different card formats by specifying the entity properties desired to be displayed for an entity.

Figure 5:
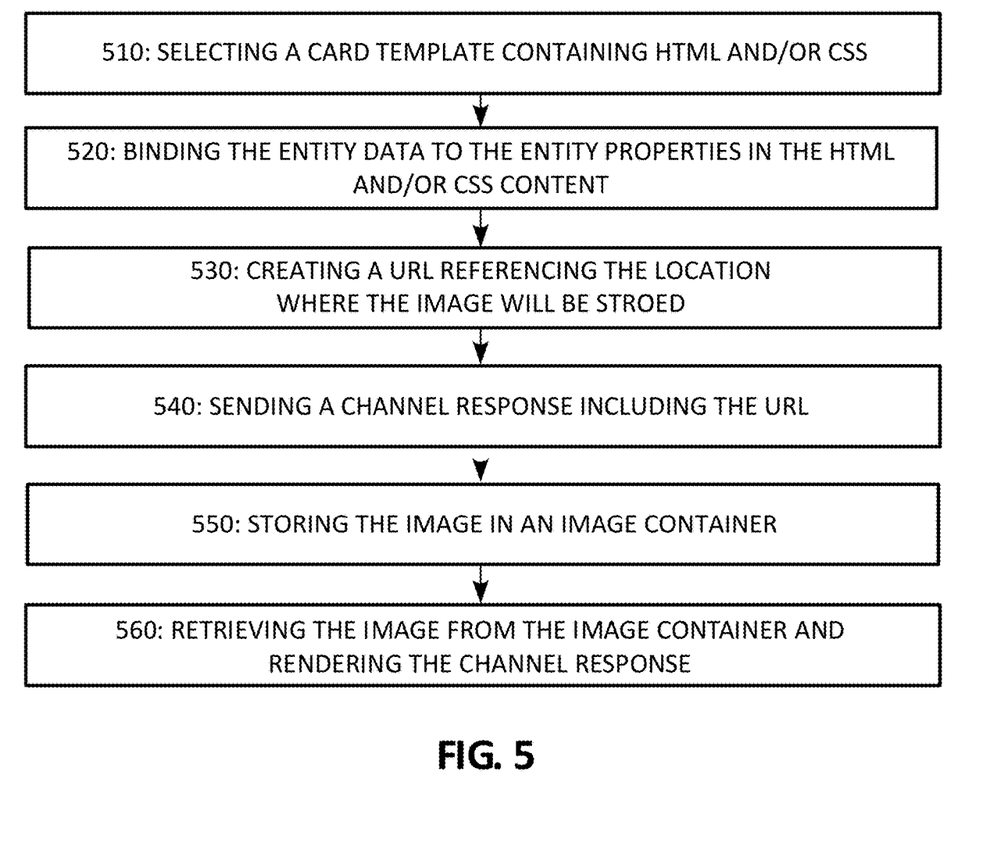
FIG. 5 shows an exemplary method for creating an image based on an image template according to an embodiment of the present disclosure.

In the event that the template selected in step 430 includes HTML and/or CSS, the bot platform 20 creates an image using the HTML and/or CSS and returns the image so that it may be rendered in a card. The image creating process using a template containing HTML and/or CSS content enhances customization and allows a developer to create rich graphical content that can be displayed over a variety of channels and canvases. An exemplary process for creating this image is illustrated in FIG. 5. In step 510, the card template selected in step 430 is a card template containing HTML and/or CSS. In step 520, the step 440 of binding entity data to one or more entity properties of the channel response comprises binding the entity data to the entity properties in the HTML and/or CSS content. In step 530, a URL is created references the location that the image will be stored. Then, in step 540 the URL is included in the channel response sent to the channel. In step 550, the image generated based on the HTML and/or CSS content is stored in the location to which the URL is pointing. Then in step 560 the client computing device 50 can retrieve the image using the URL once the bot client program 56 is ready to render the image on the computing device 50. This asynchronous method of creating the image compensates for the additional time needed to create the image from the HTML and/or CSS.

In the event that the template selected in step 430 includes speech markup language, the step 440 of binding the entity data to the entity properties comprises binding the entity data to the entity properties contained in the speech markup language of the template. In this case, the template renderer may call to the language generation service in order to generate speech based on the speech markup language included in the template. The language generation service takes the bound speech markup language and generates the appropriate natural language and returns this to the renderer in the form of speech markup language. A template response is then generated based on the speech markup language received from the language generation service.

Figure 6:
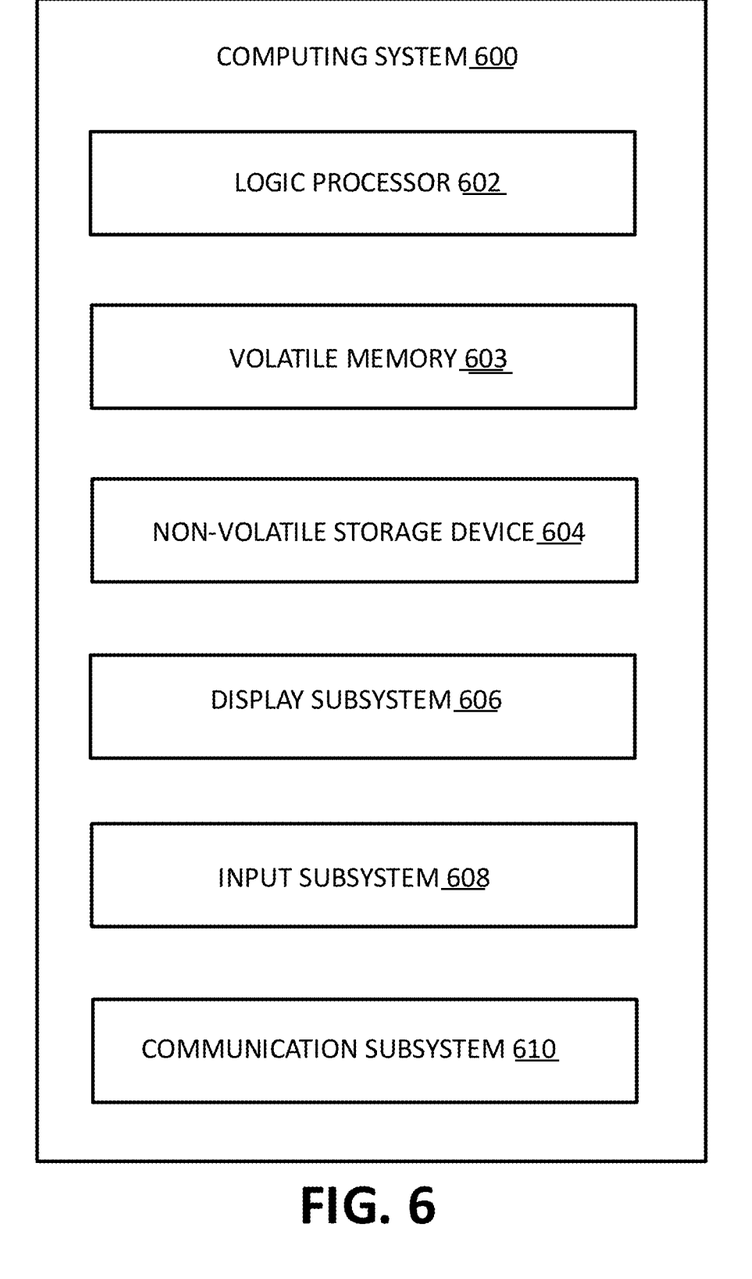
FIG. 6 shows an example computing system according to an embodiment of the present disclosure.

FIG. 6 schematically shows a non-limiting embodiment of a computing system 600 that can enact one or more of the methods and processes described above. Computing system 600 is shown in simplified form. Computing system 600 may embody the bot platform 20 of FIG. 1. Computing system 600 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 600 includes a logic processor 602 volatile memory 603, and a non-volatile storage device 604. Computing system 600 may optionally include a display subsystem 606, input subsystem 608, communication subsystem 610, and/or other components not shown in FIG. 6.

Logic processor 602 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 602 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 604 includes one or more physical devices configured to hold instructions executable by the logic processors to implement the methods and processes described herein. When such methods and processes are implemented, the state of non-volatile storage device 604 may be transformed—e.g., to hold different data.

Non-volatile storage device 604 may include physical devices that are removable and/or built-in. Non-volatile storage device 904 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 604 may include nonvolatile, dynamic, static, read/write, read-only, sequential-access, location-addressable, file-addressable, and/or content-addressable devices. It will be appreciated that non-volatile storage device 604 is configured to hold instructions even when power is cut to the non-volatile storage device 604.

Volatile memory 603 may include physical devices that include random access memory. Volatile memory 603 is typically utilized by logic processor 602 to temporarily store information during processing of software instructions. It will be appreciated that volatile memory 603 typically does not continue to store instructions when power is cut to the volatile memory 603.

Aspects of logic processor 602, volatile memory 603, and non-volatile storage device 604 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," "mechanism," and "engine" may be used to describe an aspect of computing system 600 typically implemented in software by a processor to perform a particular function using portions of volatile memory, which function involves transformative processing that specially configures the processor to perform the function. Thus, a module, program, or engine may be instantiated via logic processor 602 executing instructions held by non-volatile storage device 604, using portions of volatile memory 603. It will be understood that different modules, programs, mechanisms and/or engines may be instantiated from the same application, service, code block, object, library, routine, API, function, etc. Likewise, the same module, program, mechanism and/or engine may be instantiated by different applications, services, code blocks, objects, routines, APIs, functions, etc. The terms "module," "program," "mechanism" and "engine" may encompass individual or groups of executable files, data files, libraries, drivers, scripts, database records, etc.

When included, display subsystem 606 may be used to present a visual representation of data held by non-volatile storage device 604. The visual representation may take the form of a graphical user interface (GUI). As the herein described methods and processes change the data held by the non-volatile storage device, and thus transform the state of the non-volatile storage device, the state of display subsystem 606 may likewise be transformed to visually represent changes in the underlying data. Display subsystem 606 may include one or more display devices utilizing virtually any type of technology. Such display devices may be combined with logic processor 602, volatile memory 603, and/or non-volatile storage device 604 in a shared enclosure, or such display devices may be peripheral display devices.

When included, input subsystem 608 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 610 may be configured to communicatively couple various computing devices described herein with each other, and with other devices. Communication subsystem 610 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 600 to send and/or receive messages to and/or from other devices via a network such as the Internet.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises," "includes," "has," "comprising," "including" and/or "having," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. This description has been presented for purposes of illustration and description, but is not intended to be exhaustive or limiting in the form disclosed. Many modifications and variations will be apparent to those of ordinary skill in the art without departing from the scope and spirit of the technology. The embodiment was chosen and described in order to best explain the principles of the technology and the practical application, and to enable others of ordinary skill in the art to understand the technology for various embodiments with various modifications as are suited to the particular use contemplated.

Although specific embodiments have been described, it will be understood by those of skill in the art that there are other embodiments that are equivalent to the described embodiments. Accordingly, it is to be understood that the technology is not to be limited by the specific illustrated embodiments, but only by the scope of the appended claims.

The invention claimed is:

1. A system for rendering a channel response, the system comprising:
a processor and;
a memory communicatively coupled to the processor and storing instructions that, when executed by the processor, perform operations, comprising:
receive, via a computing device communicating over a channel from among a plurality of different channels, an input invoking a bot skill of a bot;
determine, from the input, an entity to be rendered in a card;
determine if a hash of the entity matches an existing template response in a cache storing template responses using corresponding unique hashes; and
in response to the hash of the entity not matching the existing template response in the cache:
select, from a plurality of card templates, a first card template over a second card template, the first card template being a first candidate for rendering the determined entity in a first canvas of the channel, the second card template being a second candidate for rendering the determined entity in a second canvas of the channel, the first card template being selected over the second card template based, as least in part on:
the channel;
the determined entity; and
whether the determined entity is an only entity to be rendered in the card to perform the bot skill of the bot or whether there are multiple entities to be rendered in the card to perform the bot skill of the bot;
bind entity data for the determined entity to one or more entity properties of the selected first card template;
generate the channel response using the selected first card template and the entity data;
store, in the cache, the channel response as a template response comprising (1) a corresponding hash that expires based on a timestamp defining a time until expiration and (2) the entity data bound to the selected first card template; and
cause the card to be rendered according to the first selected card template by sending the channel response to the channel, wherein a future hash, of a future entity associated with a future input invoking the bot skill within the time until expiration, is compared against the corresponding hash, and wherein the template response is output as a future card if the future hash matches the corresponding hash.

2. The system of claim 1, wherein the entity data is dynamic content.

3. The system of claim 1, wherein the plurality of card templates include one or more templates for rendering the entity in a visual card having a format designated by the channel.

4. The system of claim 1, wherein the plurality of card templates includes one or more templates for rendering the determined entity in a speech card.

5. The system of claim 1, further comprising instructions for:
when the selected first card template includes HTML content;
call to a template engine to generate an image of the HTML content;
generate a Uniform Resource Located (URL) pointing to a storage location of the image;
transmit the URL in the channel response; and
store the image in the storage location, wherein the plurality of card templates includes one or more templates having HTML content.

6. The system of claim 1, further comprising instructions for determining whether a card template that is bound to the entity exists in the cache.

7. The system of claim 1, wherein entities are organized in a class level hierarchy.

8. A method, comprising:
receiving an input from a computing device communicating over a particular channel;
determining, from the input, an entity to be rendered in order to perform a bot skill of a bot invoked by the input;
determining if a hash of the entity matches an existing template response in a cache storing template responses using corresponding unique hashes; and
in response to the hash of the entity not matching the existing template response in the cache:
selecting a first card template from a plurality of card templates for rendering the entity in a card, the first card template being a first candidate for rendering the determined entity in a first canvas of the particular channel, a second card template, of the plurality of templates, being a second candidate for rendering the determined entity in a second canvas of the particular channel, the first card template being selected based, at least in part, on:
the particular channel; and
the entity to be rendered;
binding entity data to the selected first card template to generate a response;
storing, in the cache, the response as a template response comprising (1) a corresponding hash that expires based on a timestamp defining a time until expiration and (2) the entity data bound to the selected first card template; and
causing the card to be rendered according to the first selected card template by sending the response via the particular channel, wherein a future hash, of a future entity associated with a future input invoking the bot skill within the time until expiration, is compared against the corresponding hash, and wherein the template response is output as a future card if the future hash matches the corresponding hash.

9. The method of claim 8, wherein the first card template is selected based, at least in part on at least one of: (i) a canvas in which the entity is be rendered or (ii) a number of entities being rendered in a single card.

10. The method of claim 8, wherein the entity data is dynamic content, and the method further comprises receiving the dynamic content from a bot service.

11. The method of claim 8, wherein selecting the first card template further comprises selecting the first card template for a visual card with a particular format suitable for the particular channel.

12. The method of claim 8, wherein selecting the first card template further comprises selecting the first card template for a speech card, with a particular format suitable for the particular channel.

13. The method of claim 8, wherein selecting the first card template further comprises selecting a card template having HTML content for displaying in the particular channel.

14. The method of claim 13, further comprising:
generating an image of the HTML content;
receiving the image generated based on the HTML content;
storing the image; and
generating a Uniform Resource Located (URL) for the stored image.

15. The method of claim 8, further comprising determining whether a bound template for the selected card template is cached in a cache.

16. The system of claim 1, wherein the operations further comprise:
based on the selection of the first card template, causing the card to be rendered, to a second computing device, according to the selected first card template by sending another channel response to at least a second channel, of the plurality of different channels.

17. The system of claim 1, wherein the first canvas comprises a visual layout and wherein the second canvas comprises text-to-speech.

18. The system of claim 1, the operations further comprising:
receive the future input invoking the bot skill within the time until expiration;
determine, from the future input, the future entity to be rendered in the future card;
determine if the future hash of the future entity matches the corresponding hash of the existing template response in the cache; and
in response to the future has matching the corresponding hash of the existing template response in the cache, cause the card to be rendered according to the first selected card template by sending the channel response to the channel.

19. The system of claim 1, wherein the entity data is bound to the one or more entity properties that are contained with a HTML or a CSS.

* * * * *

UNITED STATES PATENT AND TRADEMARK OFFICE
CERTIFICATE OF CORRECTION

PATENT NO. : 11,722,439 B2
APPLICATION NO. : 16/149123
DATED : August 8, 2023
INVENTOR(S) : Ravi K Bikkula et al.

Page 1 of 1

It is certified that error appears in the above-identified patent and that said Letters Patent is hereby corrected as shown below:

On the Title Page

Item (54) Title:
In the Line reading "(54) BOT PLATFORM FOR MUTIMODAL CHANNEL AGNOSTIC RENDERING OF CHANNEL RESPONSE" should read -- (54) BOT PLATFORM FOR MULTIMODAL CHANNEL AGNOSTIC RENDERING OF CHANNEL RESPONSE --.

In the Specification

Column 1, Line 1:
In the Line reading "BOT PLATFORM FOR MUTIMODAL" should read -- BOT PLATFORM FOR MULTIMODAL --.

Signed and Sealed this
Seventeenth Day of October, 2023

Katherine Kelly Vidal
*Director of the United States Patent and Trademark Office*